Feb. 4, 1969

H. HALLWOOD 3,426,341

MOISTURE DETECTION SYSTEM FOR CONDUITS

Filed April 22, 1966

INVENTOR.
HARRY HALLWOOD
BY *Watts & Fisher*

ATTORNEYS.

United States Patent Office 3,426,341
Patented Feb. 4, 1969

3,426,341
MOISTURE DETECTION SYSTEM FOR CONDUITS
Harry Hallwood, Niles, Mich., assignor, by mesne assignments, to New England Realty Co., Barberton, Ohio, a corporation of Ohio
Filed Apr. 22, 1966, Ser. No. 544,433
U.S. Cl. 340—235      8 Claims
Int. Cl. G08b 21/00; H01h 35/42; G01r 27/02

ABSTRACT OF THE DISCLOSURE

In a conduit system including an inner fluid conveying pipe and an outer protective casing, moisture detection probes are mounted between the pipe and casing at various locations and the probes are connected to a control circuit which provides an indication when a probe has absorbed moisture.

---

The present invention relates to prefabricated conduit systems and relates more particularly to a moisture detection system for detecting the presence of moisture within the conduit system.

Prefabricated conduit systems are widely used in underground installations for conducting heating fluids, such as steam, and cooling fluids from a central power plant to outlying buildings for heating and cooling purposes. In such applications, a fluid conveying pipe is disposed within a surrounding protective casing and is held in spaced relationship within the casing by spaced pipe supports. Tubes of insulating material such as fiberglass or calcium silicate are provided around the pipes within the casings. The heating systems typically carry steam at high temperatures of 350° F. and relatively high pressures or high pressure hot water at 400° F. Conduit systems may also carry oil, gas, chemicals or municipal services.

In such underground installations, leaks in the casing sometimes occur permitting the passage of ground water into the space between the casing and the pipe. Leaks in the fluid conveying pipe may also occur to contribute water and moisture to the space between the conduit casing and pipe. Initially, a leak may be small and permit only a small amount of water within the outer conduit casing. With time, the size of the leak increases until an entire section or sections become flooded. Such flooding produces a number of deleterious results. First, the water enters the insulation and destroys its insulating effect. The water also absorbs substantial quantities of heat from the fluid conveying pipe and thereby adversely affecting the efficiency of a heating system. The water in the casing is heated by the high temperatures of the fluid conveying pipe and commences to boil, causing the formation of steam which is emitted at the ends of the flooded section, many of which terminate inside manholes. The formation of steam within the casing provides an extremely corrosive atmosphere which enhances rapid deterioration of the casing, often resulting in its entire destruction.

Once the conduit section is flooded, a serious situation occurs, particularly if it occurs during the fall of the year on the heating system. During these times, the entire system has to be shut down while the flooded sections are drained, dried, and repaired. Otherwise, the flooded condition must be permitted to exist through the entire heating season.

The presence of steam in the conduit casings fill the manholes at the ends of the flooded sections. This makes it hazardous, and most often impossible, for a workman to enter the manhole to remove a drain plug to drain the system or to any other way approach the flooded conduit section for repair, unless the entire heating system is shut down.

It is desirable, therefore, that the leaks be detected early when they are quite small and before they become large enough to cause flooding of the conduit sections. Manual inspection of the conduit sections for detecting leaks is time consuming and not always practical because of the number of conduit sections which must be inspected. In addition, a manual inspection is not always sufficiently thorough or often enough to detect leaks in their early stages.

In cooling systems where a chilled fluid is conveyed by the pipe, the atmosphere within the casing condenses. Water collects in the lower part of the casing often in sufficient quantities to reach the insulation and wet it, thereby destroying its insulating effect.

With the present system, the sections of the prefabricated conduit systems are installed at slight angles so that any water in the casings will drain toward and collect at the low end. Inspection probes are positioned within the casings at their low ends. Each of the inspection probes comprises a cast body of a water absorptive material, for example, a hygroscopic material, in which a pair of relatively spaced electrodes are embedded. The resistivity of the space between the electrodes is very high and approaches infinity when the moisture absorptive material is very dry. As the moisture content of the material increases, the resistivity of the space between the electrodes decreases. The electrodes of all of the moisture detection probes are connected by individual probe circuits to a central control panel having a plurality of indicators one corresponding for each of the inspection probes at their respective probe locations.

A plurality of transistor switching circuits connect the probes to the indicators so that as the resistivity of a probe decreases, a transistor switching device places the corresponding indicator in a position to be energized. The control system further includes a power switching circuit connected in circuit with all of the indicators and their power supply. The power switching circuit is connected to all of the inspection probes and connects all of the indicators to the energizing source when the resistivity of any one of the inspection probes decreases to a predetermined point. In addition, each of the probe circuits includes a unidirectional current device for preventing circulating currents between the probe circuits which are arranged in parallel.

The present system therefore provides a detection circuit which continuously monitors and inspects the conduit system for the presence of moisture within each of the conduit sections. The presence of excessive moisture within any conduit casing is detected immediately and indicated by the indicators, a separate indicator being energized for each conduit section which has an excessive moisture condition.

The moisture detection probes are placed high in the casings so that small amounts of water which may collect in the end of the casings do not affect substantially the resistivity of the inspection probes. The inspection probes however, readily absorb moisture from small amounts of steam so that actual leaks are detected early, but that small and harmless amounts of moisture collected as from condensation do not cause spurious and unnecessary warnings.

Accordingly, the object of this invention is to provide a new and improved conduit system having means for detecting the presence of moisture and other contaminants within conduit sections.

Other objects and a fuller understanding of the invention may be had by referring to the following description and claims taken in conjunction with the accompanying drawings in which:

Figure 1:
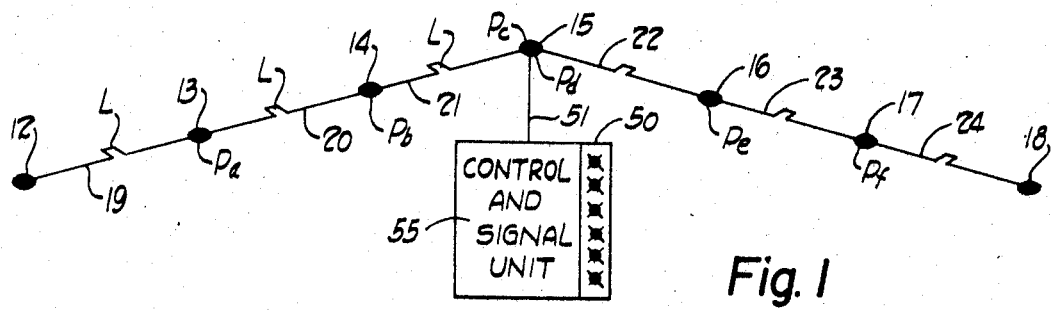
FIGURE 1 is a schematic diagram of a typical conduit system employing the moisture detection system of the present invention.

Referring now to the drawings, FIGURE 1 is a diagrammatic sketch of a conduit system utilizing the moisture detecting and indicating system of the present invention. The conduit system includes a plurality of manholes 12–18 spaced along the conduit system line and interconnected by conduit sections 19–24. Each of the conduit sections includes an expansion loop L approximately midway between the manholes 12–18. The manhole 15 is a central manhole towards which the conduit sections 19–24 slope. In other words, each of the conduit sections 19–21 slope toward manholes 13–15 respectively and the conduit sections 22–24 slope toward manholes 15–17 respectively.

Figure 2:
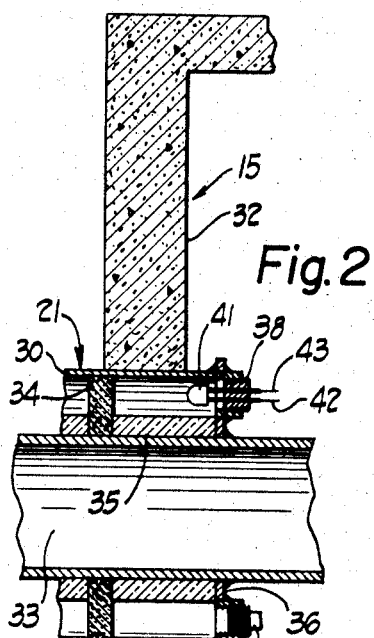
FIGURE 2 is a cross sectional view, taken longitudinally, of an end seal attached to a conduit section within a manhole in the system of FIGURE 1.

Referring to FIGURE 2, a typical conduit section 21 is shown entering a typical manhole 15. The conduit includes an outer protective casing 30 which enters through an opening in a wall 32 of the manhole 15 and terminates at an end 31 just inside the manhole 15. A fluid conveying pipe 33 extends centrally and coaxially through the outer protective conduit casing 30 and extends through the manhole to the next conduit section. Insulating spacers 34 maintain the protective casing 30 and the fluid conveying pipe 33 in spaced, concentric relation. Insulation material 35 is provided around the fluid conveying pipe 33 and is spaced from the casing 30.

An end seal plate 36 is fixed to the terminal end of the outer casing 30 and to the fluid conveying pipe 33 to provide a hermetic seal of the conduit system where it enters a manhole. A drain plug 37 is threaded in an opening in the lowermost portion of the end seal plate 36 to provide a drain access opening into the conduit.

Figure 3:
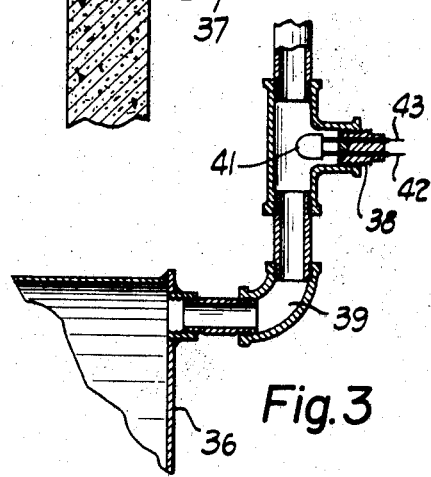
FIGURE 3 is a cross sectional view of an alternate arrangement of the end seal in the system of FIGURE 1.

A moisture detection probe 41 is carried by a plug 38 which is threaded into an opening in an upper portion of the end seal plate 36. The probe 41 protrudes into effectively a moisture detection chamber space in the conduit and communicates with the space between pipe 33 and the casing 30. Electrical conductors 42, 43 extend from the moisture detection probe 41 through bores in the plug 38 to the outside of the end seal plate 36 and into the manhole. Referring to FIGURE 3, where the upper opening in the end seal plate 36 is vented to atmosphere through vent pipe connections 39, the probe 41 extends within a chamber in the vent pipe connections 39 and communicates with the conduit space through the pipe connections. The plug 38 carrying the probe 41 is a standard pipe plug drilled and sealed. A molded, high temperature Bakelite plug is also suitable.

Figure 4:
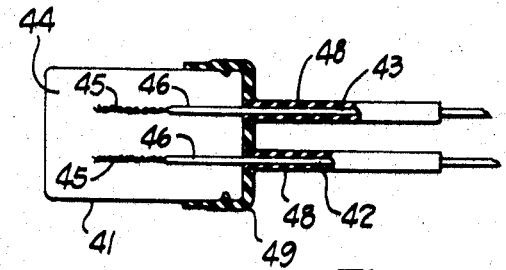
FIGURE 4 is a view, in cross section, of an inspection probe of the present invention.

Referring to FIGURE 4, the moisture detection probe 41 comprises a cast body 44 of a porous hygroscopic material, preferably calcium silicate. The calcium silicate is preferred as it is similar to the insulation material 35 used to insulate the fluid conveying pipe 33. Its characteristics as a hygroscopic material are substantially identical to that of the insulation material used and therefore provides a comparative index as to the amount of moisture absorbed by the insulation material. At the same time, the calcium silicate absorbs moisture faster and more readily than many hygroscopic materials. Finally, it also dries quickly after the moist atmosphere is removed.

The inspection probe may be fabricated in either of two ways. It may be cast by mixing the calcium silicate with water until it is very liquid and then pouring it into a mold. The electrodes are then positioned in the mold until the mixture has hardened. In the alternative, the electrodes may be forced into premanufactured stock of calcium silicate that has been mechanically formed to the desired shape.

A pair of electrodes 45 are embedded in the cast material. The electrodes 45 are the end portions of solid copper wires 46 of conductors 42, 43. Insulation material 48 on the conductors 42, 43 is stripped from the electrode ends to expose the bare wires 46.

The electrodes 45 are formed by flattening and twisting the end portions of the wires 46. The hygroscopic material of the cast body 44 surrounds the electrode ends 45 and spaces and maintains them in a spaced relation. The resistivity of the hygroscopic material between the electrodes 45 is very high when the material is dry and decreases rapidly as the body 44 absorbs moisture. A moisture seal material 49 incapsulates one end of the cast body of the probe 41 and seals the ends of the insulation material 48 where they terminate at the cast body 42. A suitable moisture sealing material is a resinous material such as an epoxy sealing compound.

Referring now to FIGURE 1, the probes 41 are located in the end seal plates 36 attached to the lowermost ends of the conduit sections 19–24 as is indicated by the reference characters Pa–Pf designating probe locations or stations. Moisture which enters the conduit system tends to collect at these lowermost ends by the force of gravity and is detected by moisture detection probes 41. Each of the probes 41 at the probe locations Pa–Pf are connected to a central control and moisture presence signal panel 50 via a multi-conductor cable 51 which carries a plurality of control conductors 52a, 52b, etc. each connected to a different probe 41 at the stations Pa–Pf and a common conductor 53 connected to all the probes 41.

The control unit 50 includes a plurality of signal lamps Sa–Sf which correspond to each of the probe stations Pa–Pf respectively. The moisture signal lamps Sa–Sf are connected to a control circuit 55 in the control unit 50. The control circuit 55 is also connected to the moisture detection probes 41 at each of the probe stations Pa–Pf and energizes those signal lamps Sa–Sf which correspond to the probes 41 at the probe locations in which moisture above a predetermined amount is detected.

Figure 5:
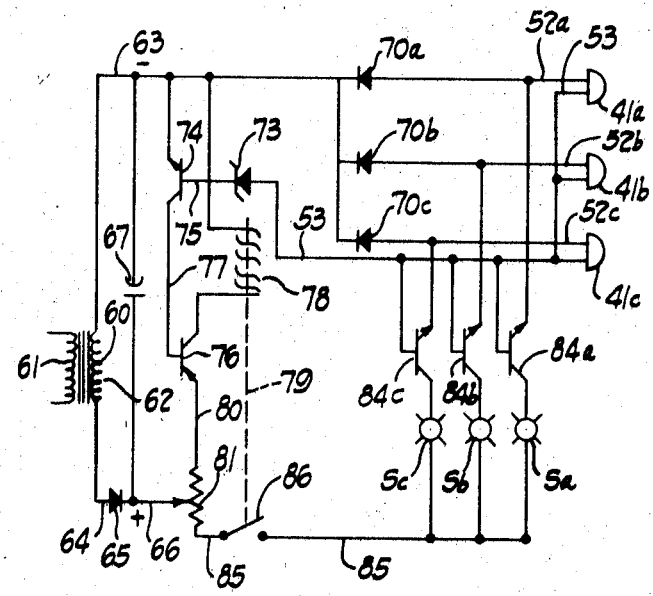
FIGURE 5 is a schematic diagram of a control system used in the moisture detection system of the present invention.

Referring to FIGURE 5, the control circuit 55 includes a power supply transformer 60 having its primary winding 61 connected to a suitable source of AC power through an on-off control switch (not shown) for controlling energization of the control circuit 55. A secondary winding 62 provides a low voltage power supply, for example 10 volts, across voltage supply conductors 63, 64. A rectifier or diode 65 is connected between the conductor 64 and a conductor 66 to provide a half-wave rectifier across the secondary winding 62 and provide a DC potential across the conductors 63, 66 with the conductor 66 being more positive than the conductor 63. A capacitor 67 is connected across the conductors 63, 66 to limit spurious voltage surges. A plurality of diodes 70a, 70b, 70c have their cathodes connected to the conductor 63 and their anodes connected to the probe conductors 52a–52c respectively. The diodes 70a–70c are unidirectional current devices and provide impedances between the conductor 63 and the conductors 52a–52c.

Only the probes 41 for the probe stations Pa–Pc are shown for purposes of simplicity of explanation, and are designated as 41a–41c. It is understood that additional probes 41d–41f are provided for probe stations Pd–Pf and also additional diodes 70d–70f connected in series with the probes 41d–41f via conductors 52d–52f respectively. Each series combination of the detection probe 41 and the diode 70 are connected in parallel with the other series connected diodes and probes. The entire parallel combination of probes and diodes are connected in series between the common return conductor 53 and the negative side conductor 63.

The common return conductor 53 is connected to the cathode of a Zener diode 73 having its anode connected to the base junction of a transistor 74 via a conductor 75. The transistor 74 is of a NPN type commonly designated as 2N35. The transistor 74 has its emitter connected to the negative side conductor 63 and its collector element connected to the base junction of a switching transistor 76 via a conductor 77. The transistor 76 is of a PNP type commonly designated as 2N1038. A collector element of the transistor 76 is connected to one side of a coil 78 of a switching relay 79. The other side of the coil 78 is connected to the conductor 63. The emitter of the transistor 76 is connected to the positive potential DC conductor 66 via a conductor 80 and a potentiometer 81. The potentiometer 81 provides an adjustment of the sensitivity of the system and sets the amount of moisture which must be sensed by the probes 41 in order for the control circuit to energize the indicator lamps Sa, Sb, Sc, etc.

A plurality of switching transistors 84a, 84b, 84c are provided for controlling energization of the signal lamps Sa–Sc respectively. The transistors 84 are preferably a NPN type commonly designated as 2N102/13. The transistors 84a–84c have their emitter elements connected via the electrode conductors 52a–52c respectively to the negative side electrodes of the probes 41a–41c respectively and their collector elements connected to one side of the signal lamps Sa–Sc respectively. The base junctions of all of the transistors 84a–84c are connected to the common return conductor 53. The other side of the signal lamps Sa–Sc are connected to a positive DC supply conductor 85 which is connected to the potentiometer 81. Contacts 86 of the relay 79 are interposed in the conductor 85 for selectively controlling energization of the conductor 85 in response to energization of the relay coil 78.

The system is placed in operation by closing the on-off switch (not shown) so that power is applied to the primary winding 61 and low voltage appears across the conductors 63, 64. If the system is operating properly, and no moisture is in any of the conduit sections 19–24, then the moisture probes 41a, 41b, etc. are all dry. The dry calcium silicate between the electrodes 45 is generally a dielectric material and provides a very high impedance between the electrodes 45 so that the probes 41 present substantially an open circuit between the conductors 63, 53.

Should there be leakage in any one of the conduit sections 19–24, such that steam collects in the conduit, then the moisture detection probe 41 in that probe location will absorb moisture from the steam changing the resistivity of the material between the electrodes 45 in that particular probe. For example, should steam collect in the conduit section 20, then the moisture detection probe 41b in the probe location Pb absorbs moisture from the steam. The absorbed moisture reduces the resistivity of the material between the electrodes 45 in the probe 41b. As the resistance provided by the probe 41b decreases with increased moisture content, the voltage on the conductor 53 goes negative making the anode of the Zener diode 73 more negative than its cathode. When the voltage across the Zener diodes 73 reaches its breakdown voltage, causing its characteristic avalanche breakdown, then current is present in the conductors 75, 53. The current in the conductor 75 biases the transistor 74 to forward bias the switching transistor 76. The transistor 76 is turned on to connect the relay coil 78 across the supply conductors 63, 66. The energized relay coil 78 closes its contacts 86 to connect the conductor 85 to positive power supply conductor 66.

At the time the moisture content of the probe 41b increased to reduce its resistivity between the electrodes 45, the decreasing voltage on the conductor 53 is applied to the base of the transistor 84b to forward bias the transistor to turn it on and connect the signal lamp Sb across the conductors 85, 52b. The indactor lamp Sb is energized, therefore, when the contacts 86 close. The energized slight Sb indicates the presence of moisture in the conduit section 20.

The breakdown voltage value of the Zener diode 73 sets the level of moisture necessary in the system to cause a signal lamp to be energized. In the preferred system shown, the Zener diode is preferably a 3.9 volt, one watt, Zener diode. The potentiometer 81 provides for adjustment of the level of the moisture needed to actuate the system as set primarily by the Zener diode 73. The diodes 70a, 70b, 70c allow current flow in one direction only through the probes 41 and thereby prevent circulating currents in the parallel probe circuits.

Although the invention has been described in its preferred form with a certain degree of particularity, it is understood that the present disclosure of the preferred form has been made only by way of example and that numerous changes in the details of construction and the combination and arrangement of parts may be restored to without departing from the spirit and the scope of the invention as hereinafter claimed.

What is claimed is:

1. In a fluid conveying system having a plurality of conduit sections each of which includes an inner fluid conveying pipe extending longitudinally and in spaced relation within an outer protective casing, a protective system for detecting moisture in the space between the pipes and casings, said protective system comprising:
   (a) a plurality of conduit sections;
   (b) said conduit sections defining a plurality of moisture detection chambers communicating with the spaces between the pipes and casings;
   (c) a plurality of moisture detection probes disposed within said moisture detection chambers;
   (d) each of said probes comprising a body of moisture absorptive material and a plurality of relatively spaced electrodes disposed in the material, the material maintaining the electrodes in their spaced relation so as to provide a very high impedance between electrodes when the material is dry and moisture free, the impedance between the electrodes decreasing with increased moisture content of the absorptive material;
   (e) a plurality of indicators corresponding to said detection probes respectively;
   (f) control circuit means connecting said detection probes to said indicators whereby increased moisture content of any such probe causes energization of its corresponding indicator, said control circuit comprising:
      (i) a plurality of switching devices for connecting said indicators in circuit across a power supply in response to a control signal supplied to their control elements;
      (ii) a plurality of probe circuits including said detection probes being connected to the control elements of said switching devices respectively so that a high impedance provided between the electrodes of a probe maintains its respective switching device off when the moisture absorptive material of that probe is dry, and turns the switching devices on when the impedance of its respective probe decreases to a predetermined point with its moisture content increased to a predetermined amount; and,
      (iii) unidirectional current devices in each of said probe circuits whereby the current in one probe circuit is prevented from circulating in another probe circuit.

2. The device of claim 1 including:
   (g) switch means interposed between the indicator means and the power supply;
   (h) a relay coil for operating said switch means;

(i) transistor means connected to said relay coil for selectively controlling energization of said coil; and, (j) a predetermined voltage breakdown device connected to said transistor means and to the probes whereby when the resistivity between the electrodes of a probe decreases to a predetermined point because of a predetermined moisture content, the voltage breakdown device undergoes a characteristic avalanche breakdown to turn the transistor device on and energize the relay coil to close said contacts and thereby connect all of the indicator means to the power supply so that all such indicator lamps connected to the switching devices turned on by their respective probes are energized.

3. The apparatus of claim 2 wherein the probes are cast bodies of calcium silicate.

4. The apparatus of claim 1 including:

(g) the casings of the conduit sections terminating within manholes;

(h) end seals attached to terminal ends of the casings and to the fluid conveying pipes to provide a hermetic seal of the space between the pipes and casings; and, (i) the detection probes being carried by the end seal and disposed to communicate with the space between the pipes and casings.

5. In a conduit system having an inner fluid conveying pipe extending longitudinally within an outer protective casing in spaced relation thereto; a protective system for detecting moisture entering into the space between the pipe and casing, said protective system comprising:

(a) a moisture detection probe carried by the conduit and being disposed in communicating relation with the space between the pipe and casing;

(b) said probe comprising a body of moisture absorptive material and a plurality of electrodes disposed in spaced relation within the material;

(c) the material being disposed in the space between electrodes so that the resistivity between the electrodes is related to the moisture content of the material;

(d) an indicator circuit means connected to the detection probe, said indicator circuit means comprising:

(i) an indicator; and, (ii) switching means having a control element and first and second switching elements, said control element being connected to the probe electrodes and said switching element being connected in an energizing circuit with the indicator, said switching means maintaining the indicator de-energized when the moisture absorptive material is very dry and has a very high impedance and said switching means energizing said indicator when the impedance of the moisture absorptive material decreases substantially because of a predetermined moisture content.

6. The system of claim 5 wherein the probe is a very porous body of calcium silicate.

7. The system of claim 5 wherein the switching means comprises a NPN transistor having base and emitter elements connected across the probe and emitter and collector elements connected in a series energizing circuit with the indicator.

8. The system of claim 7 including:

(e) an auxiliary switching device interposed in the energizing circuit for the indicator, said switching means completing the energizing circuit for the indicator when energized;

(f) transistor switching means connected to said auxiliary switching means; and, (g) a predetermined voltage breakdown device connecting the transistor switching means to said probe, said probe and said breakdown device being connected across a power supply so that as the impedance between the electrodes of the probe decreases with increased moisture content, the voltage across the breakdown device increases to a predetermined point at which it breaks down to bias the transistor switching device to energize the auxiliary switching means.

References Cited

UNITED STATES PATENTS

| | | | |
|---|---|---|---|
| 3,336,584 | 8/1967 | Kaiser | 340—242 |
| 3,382,493 | 5/1968 | Loper et al. | 340—235 X |

FOREIGN PATENTS

| | | |
|---|---|---|
| 173,653 | 1/1922 | Great Britain. |

JOHN W. CALDWELL, *Primary Examiner.*

D. MYER, *Assistant Examiner.*

U.S. Cl. X.R.

324—65; 200—61.06; 29—622